（12） United States Patent
Kobayashi

(10) Patent No.: US 11,661,137 B2
(45) Date of Patent: May 30, 2023

(54) DRIVE UNIT AND ELECTRICALLY ASSISTED VEHICLE

(71) Applicant: YAMAHA HATSUDOKI KABUSHIKI KAISHA, Iwata (JP)

(72) Inventor: Shota Kobayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 129 days.

(21) Appl. No.: 17/308,096

(22) Filed: May 5, 2021

(65) Prior Publication Data

US 2021/0394864 A1    Dec. 23, 2021

(30) Foreign Application Priority Data

May 7, 2020   (JP) .............................. JP2020-081835

(51) Int. Cl.
| | |
|---|---|
| *B62M 6/55* | (2010.01) |
| *B62M 11/02* | (2006.01) |
| *B62M 23/00* | (2006.01) |
| *F16C 19/06* | (2006.01) |
| *F16H 55/06* | (2006.01) |
| *F16H 57/02* | (2012.01) |
| *F16D 41/00* | (2006.01) |

(52) U.S. Cl.
CPC .............. *B62M 6/55* (2013.01); *B62M 11/02* (2013.01); *B62M 23/00* (2013.01); *F16C 19/06* (2013.01); *F16H 55/06* (2013.01); *F16H 57/02* (2013.01); *F16C 2326/28* (2013.01); *F16D 41/00* (2013.01); *F16H 2057/02034* (2013.01); *F16H 2057/02043* (2013.01)

(58) Field of Classification Search
CPC ........ B62M 6/55; B62M 11/02; B62M 23/00; F16C 19/06; F16C 2326/28; F16H 55/06; F16H 57/02; F16H 2057/02034; F16H 2057/02043; F16D 41/00; B62K 25/286; B62K 25/30
See application file for complete search history.

(56) References Cited

U.S. PATENT DOCUMENTS 11,203,396 B2 *  12/2021  Yamamoto ........... B62M 11/145
2019/0367127 A1 *  12/2019  Noda ....................... B62M 6/55

FOREIGN PATENT DOCUMENTS

| | | |
|---|---|---|
| EP | 3 323 702 A1 | 5/2018 |
| JP | 2014-196080 A | 10/2014 |
| JP | 2017-19445 A | 1/2017 |
| JP | 2018-54085 A | 4/2018 |

* cited by examiner

*Primary Examiner* — Victor L MacArthur
(74) *Attorney, Agent, or Firm* — Keating and Bennett, LLP

(57) ABSTRACT

A drive unit includes a decelerator rotatably supported by a housing, the decelerator including a first transmission gear, a second transmission gear having teeth of a smaller number than that of the first transmission gear, and a transmission shaft to transmit a rotation of the first transmission gear to the second transmission gear; and a bearing supporting the first transmission gear in the housing such that the first transmission gear is rotatable. A distance, in a first direction in which the transmission shaft extends in the housing, from a reference plane to teeth of the first transmission gear is less than a distance in the first direction from the reference plane to an innermost portion of the bearing, in which the reference plane passes through an outermost portion of the bearing and is perpendicular to the first direction.

13 Claims, 6 Drawing Sheets

FIG.5
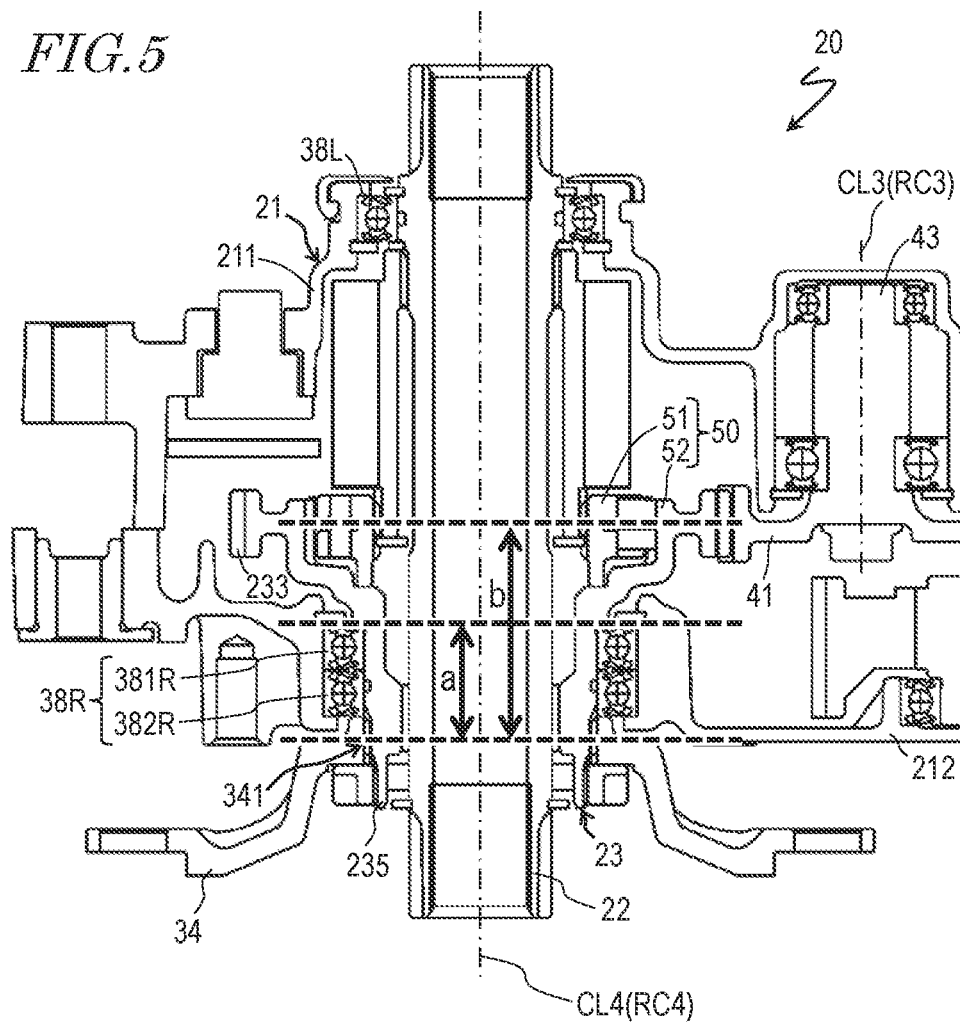
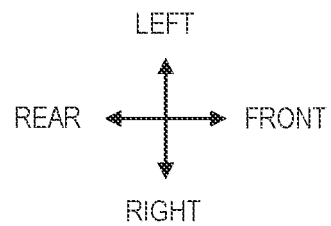

DRIVE UNIT AND ELECTRICALLY ASSISTED VEHICLE

CROSS REFERENCE TO RELATED APPLICATIONS

This application claims the benefit of priority to Japanese Patent Application No. 2020-081835 filed on May 7, 2020. The entire contents of this application are hereby incorporated herein by reference.

BACKGROUND OF THE INVENTION

1. Field of the Invention

The present invention relates to a drive unit attachable to a vehicle frame of an electrically assisted vehicle, and also to an electrically assisted vehicle including such a drive unit.

2. Description of the Related Art

An example of a vehicle movable in accordance with power generated by a power source is an electrically assisted bicycle by which power provided by a rider pedaling the bicycle is assisted by an electric motor (see, for example, Japanese Laid-Open Patent Publication No. 2014-196080). An electrically assisted bicycle causes the electric motor to generate drive power in accordance with human power applied by the rider to the pedals. Thus, the electrically assisted bicycle may alleviate the load imposed on the rider while, for example, running on a slope or running with a cargo.

The electrically assisted bicycle includes a drive unit including an electric motor and the like. Known drive units include a drive unit of a type located in a hub of a rear wheel and a drive unit of a type attached to a bottom end of a vehicle frame (in the vicinity of a bottom bracket). Recently, the latter type of drive unit is becoming mainstream.

The electrically assisted bicycle disclosed in Japanese Laid-Open Patent Publication No. 2014-196080 includes a drive unit attached to a bottom end of a vehicle frame. The drive unit includes a housing, an electric motor, a pedal crank shaft and the like. The electric motor is accommodated in the housing, and generates drive power that assists the pedal effort of the rider.

The pedal crank shaft is located to pass through the housing in a left-right direction of the vehicle. Pedals are attached to the pedal crank shaft via arms. The rotation of the pedal crank shaft is transmitted to the rear wheel via a drive sprocket, a chain, a driven sprocket and the like.

In an electrically assisted vehicle, various components need to be located in a limited space in the vehicle. If the drive unit is large, the components in the vicinity of the drive unit are restricted in the positional arrangement thereof. The drive unit itself is also restricted in the positional arrangement thereof. Therefore, the size of the drive unit is required to be decreased. Also from the point of view of decreasing the weight of the vehicle, the size of the drive unit is required to be decreased.

SUMMARY OF THE INVENTION

Preferred embodiments of the present invention provide drive units each having a decreased size, and electrically assisted vehicles including such drive units.

A drive unit according to a preferred embodiment of the present invention is usable in an electrically assisted vehicle. The drive unit includes an electric motor including an output shaft including an output gear; a housing accommodating a portion of, or an entirety of, the electric motor; a pedal crank shaft extending through the housing, rotatably supported by the housing, and including a driven gear; and a transmission to transmit a torque of the output gear of the electric motor to the driven gear. The transmission includes a decelerator rotatably supported by the housing in the housing and including a first transmission gear, a second transmission gear having teeth of a smaller number than that of the first transmission gear, and a transmission shaft to transmit a rotation of the first transmission gear to the second transmission gear; and a bearing supporting the first transmission gear in the housing such that the first transmission gear is rotatable. A distance, in a first direction in which the transmission shaft extends in the housing, from a reference plane to teeth of the first transmission gear is less than a distance in the first direction from the reference plane to an innermost portion of the bearing. The reference plane passes through an outermost portion of the bearing and is perpendicular to the first direction.

As seen in the direction perpendicular to the direction in which the transmission shaft of the decelerator extends, at least a portion of the bearing overlaps the teeth of the first transmission gear of the decelerator. With this structure, the size (width) of the drive unit in the direction in which the transmission shaft extends (in the axial direction) may be decreased.

In a preferred embodiment of the present invention, the bearing may be located between the reference plane and the first transmission gear in the first direction.

The distance from the reference plane to the teeth of the first transmission gear is less than the distance from the reference plane to the innermost portion of the bearing. In addition, the bearing is located between the reference plane and the first transmission gear. With this structure, the size (width) of the drive unit in the axial direction may be decreased.

In a preferred embodiment of the present invention, a distance between the bearing and the transmission shaft may be less than a distance between the teeth of the first transmission gear and the transmission shaft, and the first transmission gear may include a recessed portion in a region facing the bearing and that is recessed in a direction in which the distance from the reference plane relatively increases.

The first transmission gear includes the recessed portion in a region facing the bearing so that the bearing may be located between the teeth of the first transmission gear and the transmission shaft.

In a preferred embodiment of the present invention, the bearing may support the first transmission gear with an inner circumferential portion of the bearing, and an outer circumferential portion of the bearing may be supported by the housing.

The outer circumferential portion of the bearing, which supports the first transmission gear, not the transmission shaft, with the inner circumferential portion, is supported by the housing. This may improve the run-out accuracy of the first transmission gear.

In a preferred embodiment of the present invention, the first transmission gear may include a metal inner portion and a resin outer portion expanding outward in a radial direction from the metal inner portion, and the inner circumferential portion of the bearing may support the metal inner portion.

The inner circumferential portion of the bearing supports the metal inner portion of the first transmission gear, not the transmission shaft. This may improve the run-out accuracy of the first transmission gear.

In a preferred embodiment of the present invention, the decelerator may include a one-way clutch coupling the transmission shaft and the first transmission gear to each other, and the one-way clutch may regulate the rotation of the first transmission gear with respect to the transmission shaft to one direction.

If the bearing supports the transmission shaft, the first transmission gear chatters by a degree corresponding to the play of the one-way clutch. In a preferred embodiment of the present invention, the bearing supports the first transmission gear, not the transmission shaft. Since the bearing supports the first transmission gear, the run-out accuracy of the first transmission gear may be improved in a structure in which the one-way clutch is located between the transmission shaft and the first transmission gear.

In a preferred embodiment of the present invention, a distance from the reference plane to the one-way clutch may be less than the distance from the reference plane to the innermost portion of the bearing.

As seen in the direction perpendicular to the direction in which the transmission shaft of the decelerator extends, at least a portion of the bearing overlaps the one-way clutch. With this structure, the size (width) of the drive unit in the axial direction may be decreased.

In a preferred embodiment of the present invention, the bearing may include a ball bearing.

Since the bearing includes a ball bearing, both of a radial load (load in a direction perpendicular to the axial direction) and an axial load (load parallel to the axial direction) may be supported by the bearing.

In a preferred embodiment of the present invention, the bearing may include an inner race, an outer race, and a plurality of rolling elements provided between the inner race and the outer race, the bearing may support the first transmission gear with the inner race, and the outer race of the bearing may be supported by the housing.

The outer race of the bearing, which supports the first transmission gear, not the transmission shaft, with the inner race, is supported by the housing. This may improve the run-out accuracy of the first transmission gear.

In a preferred embodiment of the present invention, the first transmission gear may include a metal inner portion and a resin outer portion expanding outward in the radial direction from the metal inner portion, and the inner race of the bearing may be secured to the metal inner portion.

The inner race of the bearing is secured to the metal inner portion of the first transmission gear, not to the transmission shaft. This may improve the run-out accuracy of the first transmission gear.

An electrically assisted vehicle according to a preferred embodiment of the present invention includes the above-described drive unit.

The size of the drive unit in the left-right direction of the electrically assisted vehicle is small. Therefore, the degree of freedom of positional arrangement of the drive unit and the other components in the electrically assisted vehicle may be improved. The degree of freedom of the shape and the size of the electrically assisted vehicle and the above-mentioned other components may also be improved.

In the drive unit according to a preferred embodiment of the present invention, the distance, in the first direction in which the transmission shaft of the decelerator extends, from the reference plane to the teeth of the first transmission gear is less than the distance in the first direction from the reference plane to the innermost portion of the bearing. The reference plane passes through the outermost portion of the bearing and is perpendicular to the first direction. As seen in the direction perpendicular to the direction in which the transmission shaft of the decelerator extends, at least a portion of the bearing overlaps the teeth of the first transmission gear of the decelerator. With this structure, the size (width) of the drive unit in the direction in which the transmission shaft extends (in the axial direction) may be decreased.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a cross-sectional view showing a structure of a driven gear 233 and the vicinity thereof in the drive unit 20 according to a preferred embodiment of the present invention.

DETAILED DESCRIPTION OF THE PREFERRED EMBODIMENTS

Hereinafter, drive units and electrically assisted vehicles including the drive units according to preferred embodiments of the present invention will be described with reference to the drawings. In the description of the preferred embodiments, like components will bear like reference signs, and overlapping descriptions will be omitted. In the preferred embodiments of the present invention, "front", "rear", "left", "right", "up" and "down" respectively refer to "front", "rear", "left", "right", "up" and "down" based on a state where a rider is sitting on a saddle (seat) of the electrically assisted vehicle while facing a handle. The following preferred embodiments are merely illustrative, and the present invention is not limited to the following preferred embodiments in any way.

Electrically Assisted Bicycle

Figure 1:
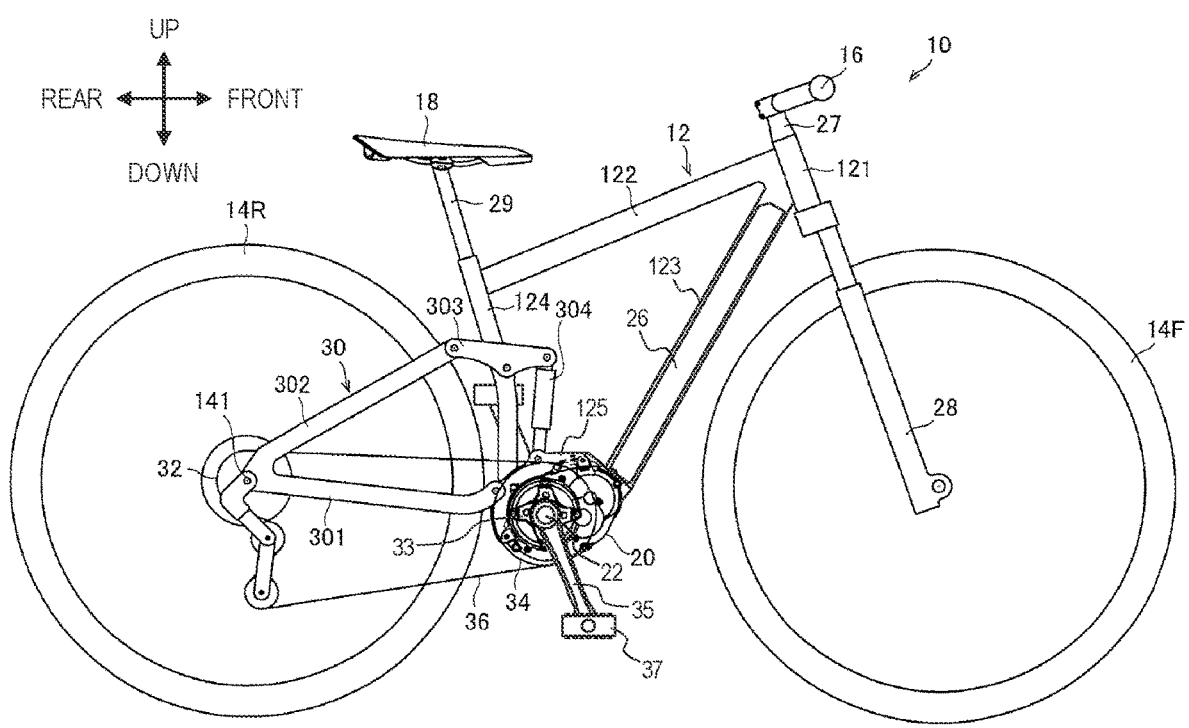
FIG. 1 is a right side view of an electrically assisted bicycle 10 according to a preferred embodiment of the present invention.

With reference to FIG. 1, an electrically assisted bicycle 10 as an example of electrically assisted vehicle according to a preferred embodiment of the present invention will be described. FIG. 1 is a right side view generally showing a structure of the electrically assisted vehicle 10.

The electrically assisted bicycle 10 includes a vehicle frame 12, a front wheel 14F, a rear wheel 14R, a handle 16 and a saddle 18. The electrically assisted bicycle 10 further includes a drive unit 20 and a battery unit 26.

The vehicle frame 12 includes a head tube 121, a top tube 122, a down tube 123, a seat tube 124, and a bracket 125.

The head tube 121 is located in a front portion of the vehicle frame 12, and extends in an up-down direction. A stem 27 is rotatably inserted into the head tube 121. A handle 16 is secured to a top end of the stem 27. A front fork 28 is secured to a bottom end of the stem 27. The front wheel 14F is rotatably attached to a bottom end of the front fork 28. More specifically, the front wheel 14F is supported by the vehicle frame 12 via the stem 27 and the front fork 28.

The top tube 122 is located to the rear of the head tube 121, and extends in a front-rear direction. A front end of the top tube 122 is connected with the head tube 121. A rear end of the top tube 122 is connected with the seat tube 124.

The down tube 123 is located to the rear of the head tube 121, and extends in the front-rear direction. The down tube 123 is located below the top tube 122. A front end of the down tube 123 is connected with the head tube 121. In the example shown in FIG. 1, a front portion of the down tube 123 is also connected with a front end portion of the top tube 122. A rear end of the down tube 123 is connected with the bracket 125.

The battery unit 26 is attached to the down tube 123. In the example shown in FIG. 1, the battery unit 26 is attached to the inside of the down tube 123. The battery unit 26 supplies electric power to the drive unit 20. The battery unit 26 includes a battery and a control circuit. The battery is a rechargeable battery rechargeable and dischargeable. The control circuit controls the charge and discharge of the battery, and also monitors the output current, the remaining battery level and the like of the battery.

The seat tube 124 is located to the rear of the top tube 122 and the down tube 123, and extends in the up-down direction. A bottom end of the seat tube 124 is connected with the bracket 125. More specifically, the seat tube 124 extends upward from the bracket 125.

In the example shown in FIG. 1, the seat tube 124 is bent at a middle position in the up-down direction. As a result, a bottom portion of the seat tube 124 extends in the up-down direction, whereas a top portion of the seat tube 124 extends in a direction inclined with respect to the up-down direction.

A seat post 29 is inserted into the seat tube 124. The saddle 18 is attached to a top end of the seat post 29.

The bracket 125 is located at a bottom end of the vehicle frame 12. The bracket 125 supports the drive unit 20. The drive unit 20 attached to the vehicle frame 12 generates drive power to be transmitted to a wheel (in this example, the rear wheel 14R). The details of the drive unit 20 will be described below.

The vehicle frame 12 further includes a swing arm 30, a pair of connection arms 303 and a suspension 304. The swing arm 30 includes a pair of chainstays 301 and a pair of seatstays 302.

The pair of chainstays 301 each extend in the front-rear direction. The pair of chainstays 301 are located side by side in the left-right direction. The rear wheel 14R is located between the pair of chainstays 301. The pair of chainstays 301 are located bilaterally symmetrically. Therefore, FIG. 1 shows only the right chainstay 301.

A front end portion of each of the chainstays 301 is attached to the bracket 125. More specifically, each chainstay 301 extends rearward from the bracket 125. Each chainstay 301 is swingable, about an axis line extending in the left-right direction, with respect to the bracket 125.

An axle 141 of the rear wheel 14R is non-rotatably attached to a rear end portion of each chainstay 301. More specifically, the rear wheel 14R is supported by the pair of chainstays 301 so as to be rotatable about the axle 141. In other words, the rear wheel 14R is supported by the vehicle frame 12. A multi-stage driven sprocket 32 is secured to the rear wheel 14R.

The pair of seatstays 302 each extend in the front-rear direction. The pair of seatstays 302 are located side by side in the left-right direction. The rear wheel 14R is located between the pair of seatstays 302. The pair of seatstays 302 are located bilaterally symmetrically. Therefore, FIG. 1 shows only the right seatstay 302.

A rear end portion of the left seatstay 302 is connected with the rear end portion of the left chainstay 301. A rear end portion of the right seatstay 302 is connected with the rear end portion of the right chainstay 301.

The pair of connection arms 303 each extend in the front-rear direction. The pair of connection arms 303 are located side by side in the left-right direction. The seat tube 124 is located between the pair of connection arms 303. The pair of connection arms 303 are located bilaterally symmetrically. Therefore, FIG. 1 shows only the right connection arm 303.

Each of the connection arms 303 is attached to the seat tube 124. Each connection arm 303 is swingable, about an axis line extending in the left-right direction, with respect to the seat tube 124.

As seen in a side view of the vehicle, a front end of each connection arm 303 is located to the front of the seat tube 124. As seen in a side view of the vehicle, a rear end of each connection arm 303 is located to the rear of the seat tube 124.

A rear end portion of the right connection arm 303 is attached to a front end portion of the right seatstay 302. The right connection arm 303 is swingable, about an axis line extending in the left-right direction, with respect to the right seatstay 302.

A rear end portion of the left connection arm 303 is attached to a front end portion of the left seatstay 302. The left connection arm 303 is swingable, about an axis line extending in the left-right direction, with respect to the left seatstay 302.

The suspension 304 is located to the front of the seat tube 124 and to the rear of the down tube 123. A top end portion of the suspension 304 is attached to the pair of connection arms 303. The suspension 304 is swingable, about an axis line extending in the left-right direction, with respect to the pair of connection arms 303. A bottom end portion of the suspension 304 is attached to the bracket 125. The suspension 304 is swingable, about an axis line extending in the left-right direction, with respect to the bracket 125. The position at which the suspension 304 is attached to the bracket 125 is to the front of the position at which the seat tube 124 is attached to the bracket 125.

A drive sprocket 34 is attached to the drive unit 20 via a support member 33. A chain is wound along the drive sprocket 34 and the driven sprocket 32.

Drive Unit

Figure 2:
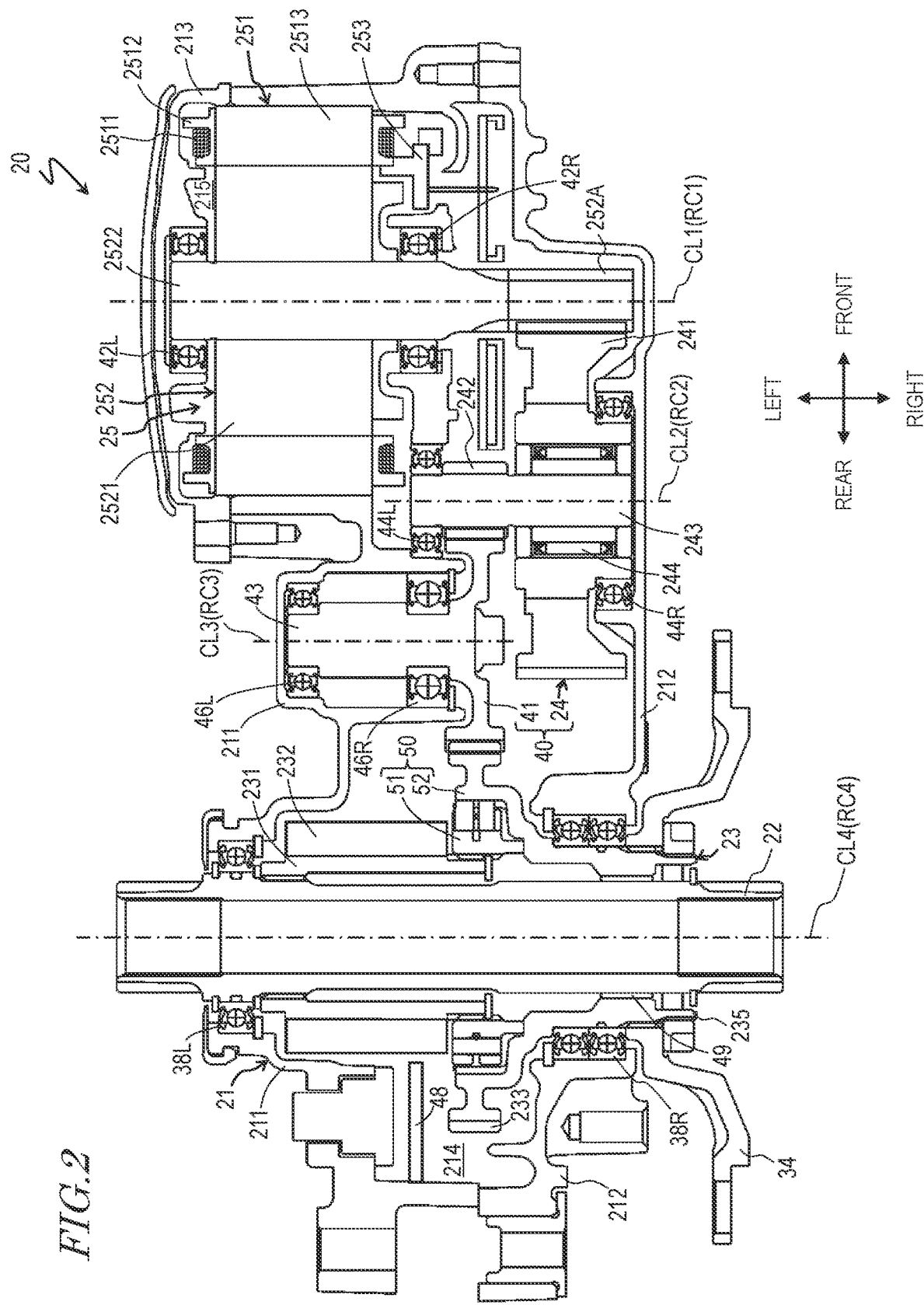
FIG. 2 is a cross-sectional view showing an internal structure of a drive unit 20 included in the electrically assisted bicycle 10 according to a preferred embodiment of the present invention.

With reference to FIG. 2, an example of structure of the drive unit 20 will be described. FIG. 2 is a cross-sectional view showing an example of internal structure of the drive unit 20.

As shown in FIG. 2, the drive unit 20 includes a housing 21, a pedal crank shaft 22, a rotation shaft 23, a transmission mechanism 40 and an electric motor 25.

First, a structure of the housing 21 according to this preferred embodiment will be described.

The housing 21 is secured to the bracket 125 (FIG. 1) via a plurality of tightening tools. The housing 21 includes a first case 211, a second case 212, and a cover 213. The first case 211, the second case 212 and the cover 213 are each made of a metal material (e.g., an aluminum alloy).

The first case 211 fits to the second case 212 from the left in the left-right direction. The first case 211 and the second case 212 are secured to each other via a plurality of tightening tools. As a result, a space 214 is formed between the first case 211 and the second case 212.

The cover 213 fits to the first case 211 from the left in the left-right direction. The cover 213 and the first case 211 are secured to each other via a plurality of tightening tools. As a result, a space 215 enclosed by the cover 213 is formed to the left of the first case 211. The motor 25 is accommodated in the space 215.

Now, a structure of the pedal crank shaft 22 according to this preferred embodiment will be described.

The pedal crank shaft 22 extends through the housing 21 in the left-right direction of the vehicle, and is rotatably supported by the housing 21. A central axis line CL4 of the pedal crank shaft 22 extends in the left-right direction. As seen in an axial direction of the pedal crank shaft 22 (in a thrust direction), the central axis line CL4 is a rotation center axis RC4 (fourth central axis) of the pedal crank shaft 22. The pedal crank shaft 22 is rotatable, about the central axis line CL4, with respect to the housing 21.

The pedal crank shaft 22 extends through the housing 21 along the fourth central axis RC4, and is supported by the housing 21 so as to be rotatable about the fourth central axis RC4. In the housing 21, the pedal crank shaft 22 is rotatably supported by a pair of bearings 38L and 38R. The bearing 38L is located on the left side in the axial direction, and is secured to the first case 211. The bearing 38R is located on the right side in the axial direction, and is secured to the second case 212.

The pedal crank shaft 22 extends through the rotation shaft 23. The rotation shaft 23 is accommodated in the housing 21. The details of the rotation shaft 23 will be described below. A pair of, namely, left and right, crank arms 35 (see FIG. 1) are attached to the pedal crank shaft 22. A pedal 37 (see FIG. 1) is attached to each of the crank arms 35.

Now, a structure of the electric motor 25 and the transmission mechanism 40 according to this preferred embodiment will be described.

The electric motor 25 is accommodated in the housing 21, and is secured to the housing 21. The electric motor 25 generates drive power that assists the running of the electrically assisted bicycle 10. The electric motor 25 includes a stator 251 and a rotor 252.

The stator 251 includes a plurality of bobbins 2512, around each of which a coil 2511 is wound. An iron core 2513 is inserted into each of the bobbins 2512. The stator 251 is located in the space 215. In this state, the stator 251 is secured to the first case 211.

A support member 253 is attached to the stator 251. The support member 253 is made of a resin material. A plurality of busbars (not shown) are embedded in the support member 253. The busbars are each connected with the coil 2511 corresponding thereto. Transmission of electric power to the busbars is controlled so that a magnetic force is generated in the stator 251.

The rotor 252 is located inward of the stator 251. A central axis line CL1 of the rotor 252 is parallel or substantially parallel to the central axis line CL4 of the pedal crank shaft 22. More specifically, the rotor 252 is located parallel or substantially parallel to the central axis line CL4 of the pedal crank shaft 22. As seen in the axial direction of the pedal crank shaft 22, the central axis line CL1 is a rotation center axis RC1 (first central axis) of the rotor 252.

The rotor 252 includes a rotor main body 2521 and an output shaft 2522. An outer circumferential surface of the rotor main body 2521 is magnetized with N poles and S poles alternately in a circumferential direction.

The output shaft 2522 extends through the rotor main body 2521. The output shaft 2522 is secured to the rotor main body 2521. More specifically, the output shaft 2522 is rotatable together with the rotor main body 2521.

In the housing 21, the output shaft 2522 is supported by the housing 21 so as to be rotatable about the first central axis RC1. The output shaft 2522 is supported by two bearings 42L and 42R so as to be rotatable, about the central axis line CL1, with respect to the housing 21. The bearing 42L is secured to the cover 213. The bearing 42R is located to the right of the rotor main body 2521, and is secured to the first case 211. The output shaft 2522 extends through the first case 211. A portion of the output shaft 2522 that is located in the space 214 includes an output gear 252A provided thereon. The output gear 252A is, for example, a helical gear.

The transmission mechanism 40 is accommodated in the housing 21. Specifically, the transmission mechanism 40 is located in the space 214. The transmission mechanism 40 includes a decelerator 24, an idle gear 41, and a rotation shaft 43. The transmission mechanism 40 transmits a torque of the output gear 252A of the electric motor 25 to a driven gear 233 described below.

The decelerator 24 is rotatably supported by the housing 21, and increases the torque of the output gear 252A of the electric motor 25. The decelerator 24 includes a first transmission gear 241, a second transmission gear 242, and a transmission shaft 243. A central axis line CL2 of the transmission shaft 243 is parallel or substantially parallel to the central axis line CL4 of the pedal crank shaft 22. More specifically, the transmission shaft 243 extends parallel or substantially parallel to the central axis line CL4 of the pedal crank shaft 22. As seen in an axial direction of the transmission shaft 243, namely, in the axial direction of the pedal crank shaft 22, the central axis line CL2 is a rotation center axis RC2 (second central axis) of the transmission shaft 243. In the housing 21, the decelerator 24 is supported by the housing 21 so as to be rotatable about the second central axis RC2.

The first transmission gear 241 is located on a right portion of the transmission shaft 243 in the axial direction. A left portion of the transmission shaft 243 is rotatably supported by a bearing 44L. The first transmission gear 241 located on the right portion of the transmission shaft 243 is rotatably supported by a bearing 44R. The transmission shaft 243 and the first transmission gear 241 are supported by the two bearings 44L and 44R so as to be rotatable about the central axis line CL2. The bearing 44L is secured to the first case 211. The bearing 44R is secured to the second case 212.

The first transmission gear 241 is meshed with the output gear 252A of the electric motor 25. With this structure, the drive power generated by the electric motor 25 is transmitted to the first transmission gear 241 from the output gear 252A.

A one-way clutch 244 is located between the first transmission gear 241 and the transmission shaft 243. The one-way clutch 244 couples the transmission shaft 243 and the first transmission gear 241 to each other. The one-way clutch 244 regulates the rotation of the first transmission gear 241 with respect to the transmission shaft 243 to one direction. A rotation force of the output gear 252A acting in such a direction as to rotate the rear wheel 14R (FIG. 1) of the electrically assisted bicycle 10 forward is transmitted to the transmission shaft 243 via the first transmission gear 241, whereas a rotation force of the output gear 252A acting in such a direction as to rotate the rear wheel 14R rearward is not transmitted to the transmission shaft 243. The one-way clutch 244 also prevents a forward rotation force of the pedal crank shaft 22 generated by human power of the rider from being transmitted to the electric motor 25.

The first transmission gear 241 has a diameter greater than that of the output gear 252A of the electric motor 25, and includes teeth of a larger number than that of the output gear 252A. More specifically, the first transmission gear 241 is decelerated more than the output gear 252A.

The second transmission gear 242 is made of a metal material (e.g., iron). The second transmission gear 242 is located on the transmission shaft 243. The second transmission gear 242 is located at a position different from that of the first transmission gear 241 in the axial direction of the transmission shaft 243. The second transmission gear 242 has a diameter less than that of the first transmission gear 241, and includes teeth of a smaller number than that of the first transmission gear 241. The transmission shaft 243 and the second transmission gear 242 are integral in this preferred embodiment, but are not limited to this. The second transmission gear 242 may be secured to the transmission shaft 243 by serration coupling (or by press-fit). The second transmission gear 242 is rotatable together with the transmission shaft 243. The transmission shaft 243 transmits the rotation of the first transmission gear 241 to the second transmission gear 242.

The idle gear 41 is made of a metal material (e.g., iron). The idle gear 41 is located on the rotation shaft 43. The idle gear 41 is secured to the rotation shaft 43 by, for example, a tightening tool, but is not limited to this. The idle gear 41 may be secured to the rotation shaft 43 by serration coupling (or by press-fit). The idle gear 41 and the rotation shaft 43 may be integral. The idle gear 41 is rotatable together with the rotation shaft 43.

A central axis line CL3 of the rotation shaft 43 is parallel or substantially parallel to the central axis line CL4 of the pedal crank shaft 22. More specifically, the rotation shaft 43 extends parallel or substantially parallel to the central axis line CL4 of the pedal crank shaft 22. As seen in an axial direction of the rotation shaft 43, namely, in the axial direction of the pedal crank shaft 22, the central axis line CL3 is a rotation center axis RC3 (third central axis) of the rotation shaft 43. In the housing 21, the idle gear 41 secured by the rotation shaft 43 is supported by the housing 21 so as to be rotatable about the third central axis RC3.

The rotation shaft 43 is supported by two bearings 46L and 46R so as to be rotatable about the central axis line CL3. The bearings 46L and 46R are secured to the first case 211. The idle gear 41 is located closer to the bearing 46R than to the bearing 46L in the axial direction of the rotation shaft 43. The idle gear 41 is meshed with the second transmission gear 242 of the decelerator 24. With this structure, the output torque of the electric motor 25 increased by the decelerator 24 is transmitted to the idle gear 41.

Now, a structure of the vicinity of the pedal crank shaft 22 will be described.

The rotation shaft 23 is coaxial with the pedal crank shaft 22, and is rotatable together with the pedal crank shaft 22. The rotation shaft 23 includes a coupling shaft 231 and a one-way clutch 50.

The coupling shaft 231 has a cylindrical shape. The pedal crank shaft 22 is inserted into the coupling shaft 231. The coupling shaft 231 is coaxial with the pedal crank shaft 22.

A left end portion of the coupling shaft 231 is coupled with the pedal crank shaft 22 by serration coupling or the like. As a result, regardless of whether the pedal crank shaft 22 is rotated forward or rearward, the coupling shaft 231 is rotated together with the pedal crank shaft 22.

A torque detection device 232 is located around the coupling shaft 231. The torque detection device 232 is supported by the coupling shaft 231, and is not rotatable with respect to the first case 211. The torque detection device 232 detects a torque generated in the coupling shaft 231 when the driver steps on the pedals. The torque detection device 232 is, for example, a magnetostrictive torque sensor. The torque detection device 232 outputs a signal in accordance with the detected torque to a controller mounted on a substrate 48. The controller refers to the torque detected by the torque detection device 232 to learn the state of the pedaling performed by the driver and control the electric motor 25.

The one-way clutch 50 is located to the right of the torque detection device 232 in the axial direction of the pedal crank shaft 22. The one-way clutch 50 is located on the pedal crank shaft 22 via the coupling shaft 231. The one-way clutch 50 is coaxial with the pedal crank shaft 22. The one-way clutch 50 includes an inner member 51 and an outer member 52.

The inner member 51 of the one-way clutch 50 has a cylindrical shape. A right portion of the coupling shaft 231 is inserted into the inner member 51. The inner member 51 is coaxial with the coupling shaft 231. In this state, the right portion of the coupling shaft 231 is coupled with the inner member 51 by serration coupling or the like. As a result, regardless of whether the coupling shaft 231 is rotated forward or rearward, the inner member 51 is rotated together with the coupling shaft 231. More specifically, regardless of whether the pedal crank shaft 22 is rotated forward or rearward, the inner member 51 is rotated together with the pedal crank shaft 22. The coupling shaft 231 and the inner member 51 act as a crank rotation input shaft that is rotatable integrally with the pedal crank shaft 22.

The outer member 52 of the one-way clutch 50 has a cylindrical shape. The pedal crank shaft 22 is inserted into the outer member 52. A slide bearing 49 is located between the outer member 52 and the pedal crank shaft 22. With this structure, the outer member 52 is located to be rotatable coaxially with the pedal crank shaft 22.

A latchet mechanism as a one-way clutch mechanism is provided between the outer member 52 and the inner member 51. With this structure, a forward rotation force of the inner member 51 is transmitted to the outer member 52, whereas a rearward rotation force of the inner member 51 is not transmitted to the outer member 52. A forward rotation force of the outer member 52 generated by the rotation of the electric motor 25 is not transmitted to the inner member 51.

The outer member 52 is supported by the bearing 38R so as to be rotatable, about the central axis line CL4 of the pedal crank shaft 22, with respect to the housing 21. The outer member 52 extends through the second case 212. The drive sprocket 34 is attached to a portion of the outer member 25 that is outward of (to the right of) the housing 21.

The outer member 52 includes the driven gear 233. The driven gear 233 is located on the pedal crank shaft 22 via the one-way clutch 50 and the coupling shaft 231. The driven gear 233 is meshed with the idle gear 41. The driven gear 233 has a diameter greater than that of each of the second transmission gear 242 and the idle gear 41, and includes teeth of a larger number than that of each of the second transmission gear 242 and the idle gear 41. More specifically, the driven gear 233 is rotated at a rotation rate lower than the rotation rate of each of the second transmission gear 242 and the idle gear 41. The idle gear 41 is meshed with each of the second transmission gear 242 and the driven gear 233 so that the output torque of the electric motor 25 increased by the decelerator 24 may be transmitted to the driven gear 233 via the single idle gear 41.

The outer member 52 transmits a resultant force of the human power (pedal effort) transmitted to the coupling shaft 231 and assist drive power of the electric motor 25 to the drive sprocket 34. The outer member 52 defines a resultant force output shaft 235, which combines the human power that is input via the one-way clutch 50 and the assist drive power that is input via the driven gear 233 and outputs the resultant force. The resultant force output shaft 235 rotates coaxially with the pedal crank shaft 22. The resultant force output shaft 235 is included in the rotation shaft 23.

Decelerator

Figure 3:
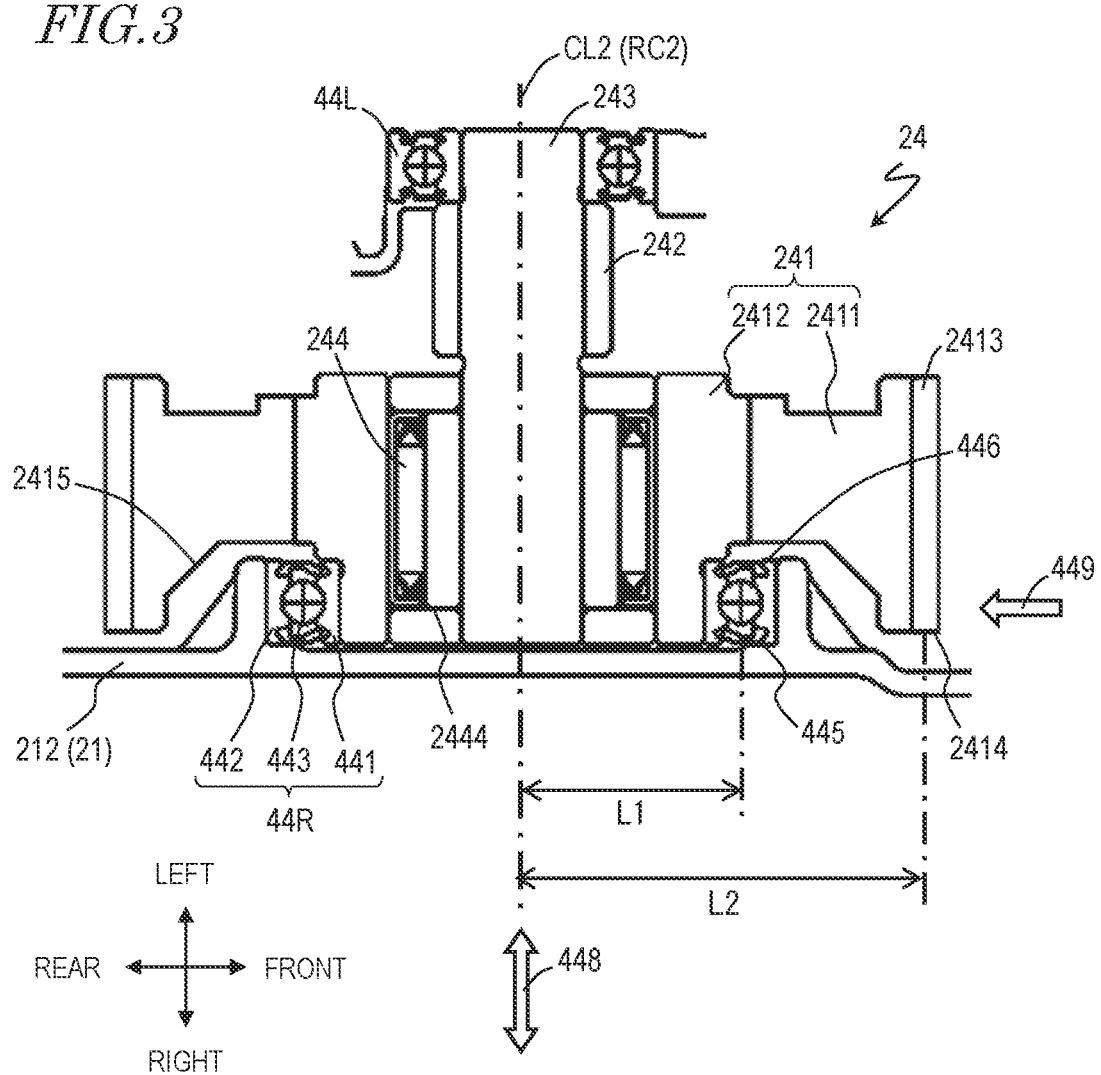
FIG. 3 is a cross-sectional view showing an internal structure of a decelerator 24 included in the drive unit 20 according to a preferred embodiment of the present invention.
Figure 4:
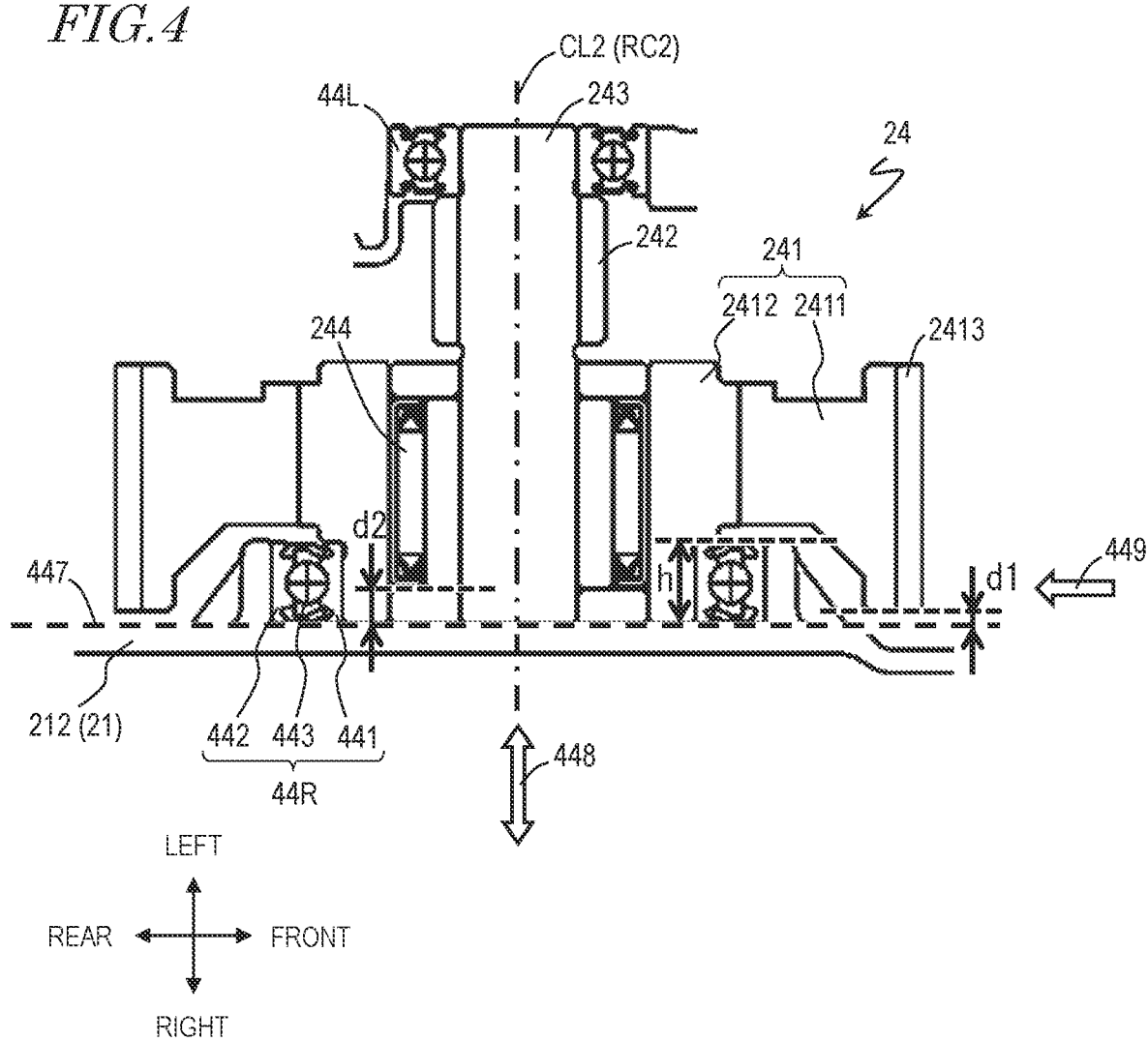
FIG. 4 is a cross-sectional view showing the internal structure of the decelerator 24 included in the drive unit 20 according to a preferred embodiment of the present invention.

Now, with reference to FIG. 3 and FIG. 4, the structure of the decelerator 24 will be described in more detail. FIG. 3 and FIG. 4 are each a cross-sectional view showing an example of internal structure of the decelerator 24. As described above, the decelerator 24 includes the first transmission gear 241, the second transmission gear 242, the transmission shaft 243, and the one-way clutch 244.

The first transmission gear 241 in this preferred embodiment includes a metal inner portion 2412 and a resin outer portion 2411 expanding outward in a radial direction from the metal inner portion 2412. The first transmission gear 241 including the metal inner portion 2412 and the resin outer portion 2411 expanding outward from the metal inner portion 2412 may be achieved by, for example, insert molding. The first transmission gear 241 has a plurality of teeth 2413 provided at an outer circumferential surface thereof. The teeth 2413 of the first transmission gear 241 are meshed with the output gear 252A (FIG. 2) of the electric motor 25. The one-way clutch 244 is located between the metal inner portion 2412 and the transmission shaft 243.

The first transmission gear 241 is supported by the bearing 44R, which is a bearing device. In the example shown in FIG. 3 and FIG. 4, the bearing 44R is a rolling-element bearing including an inner race 441, an outer race 442 and a plurality of rolling elements 443 provided between the inner race 441 and the outer race 442. The inner race 441 of the bearing 44R is an inner circumferential portion of the bearing device, whereas the outer race 442 is an outer circumferential portion of the bearing device. The bearing 44R is, for example, a ball bearing.

The outer race 442 of the bearing 44R is secured to the second case 212 of the housing 21, and is supported by the housing 21. The inner race 441 is secured to the metal inner portion 2412 of the first transmission gear 241, and supports the metal inner portion 2412.

Now, the positional relationship between the components of the decelerator 24 and the bearing 44R will be described.

Referring to FIG. 3, in an axial direction 448 in which the transmission shaft 243 extends, a portion of the bearing 44R that is closest to the outside of the housing 21 is referred to as an "outermost portion 445". A portion, of the bearing 44R in the housing 21, that is located at an innermost position is referred to as an "innermost portion 446". A portion of the teeth 2413 of the first transmission gear 241 that is closest to the outside of the housing 21 is referred to as an "outermost portion 2414".

Referring to FIG. 3 and FIG. 4, a plane that passes through the outermost portion 445 of the bearing 44R and is perpendicular to the axial direction 448 is labeled as a "reference plane 447". Where the distance from the reference plane 447 to the outermost portion 2414 of the teeth 2413 is labeled as d1, and the distance from the reference plane 447 to the innermost portion 446 of the bearing 44R is labeled as h, distance d1 is less than distance h. In other words, as seen in a direction 449 perpendicular to the axial direction 448, at least a portion of the bearing 44R overlaps the teeth 2413 of the first transmission gear 241. The bearing 44R is located between the reference plane 447 and the first transmission gear 241 in the axial direction 448. The first transmission gear 241 is located so as to cover the bearing 44R. With this structure, the size (width) of the drive unit 20 in the axial direction 448 may be decreased.

The size of the drive unit 20 in the width direction of the electrically assisted bicycle 10 may be decreased so that the degree of freedom of positional arrangement of the drive unit 20 and the other components in the electrically assisted bicycle 10 may be improved. The degree of freedom of the shape and the size of the electrically assisted bicycle 10 and the above-mentioned other components may also be increased. In addition, the weight of the drive unit 20 may be decreased, and the electrically assisted bicycle 10 may be made more lightweight.

With reference to FIG. 3, distance L1 between the center of each of the rolling elements 443 of the bearing 44R and the central axis line CL2 of the transmission shaft 243 is less than distance L2 between the center of the teeth 2413 of the first transmission gear 241 and the central axis line CL2. For example, the position of the center of each of the rolling elements 443 of the bearing 44R may be the position of the center point of a line segment connecting an inner circumferential surface and an outer circumferential surface of the bearing 44R in a radial direction of the bearing 44R, but is not limited to this. The position of the center of the teeth 2413 is the position of the center point of a line segment connecting a base and a tip of the teeth 2413 in a radial direction of the first transmission gear 241. The first transmission gear 241 has a recessed portion 2415 in a region facing the bearing 44R. The recessed portion 2415 is recessed in a direction in which the distance from the reference plane 447 (FIG. 4) relatively increases. The first transmission gear 241 has the recessed portion 2415 so that the bearing 44R may be located between the teeth 2413 of the first transmission gear 241 and the transmission shaft 243.

The one-way clutch 244 is located between the first transmission gear 241 and the transmission shaft 243. Referring to FIG. 3, a portion of the one-way clutch 244 that is closest to the outside of the housing 21 in the axial direction 448 is referred to as an "outermost portion 2444". Referring to FIG. 3 and FIG. 4, the distance from the reference plane 447 to the outermost portion 2444 of the one-way clutch 244 is labeled as d2. Distance d2 is less than distance h from the reference plane 447 to the innermost portion 446 of the bearing 44R. As seen in the direction 449 perpendicular to the axial direction 448, at least a portion of the bearing 44R overlaps the one-way clutch 244. This characteristic allows the size (width) of the drive unit 20 in the axial direction to be further decreased.

Now, a structure in which the bearing 44R supports the first transmission gear 241, not the transmission shaft 243, will be described. In this preferred embodiment, the bearing 44R supports the first transmission gear 241, not the transmission shaft 243. In the example shown in FIG. 3, the inner race 441 of the bearing 44R directly supports the metal inner portion 2412 of the first transmission gear 241. The bearing 44R supported by the housing 21 supports the first transmission gear 241 so that the run-out accuracy of the first transmission gear 241 may be improved.

Especially in a structure in which the one-way clutch 244 is located between the transmission shaft 243 and the first transmission gear 241, the run-out accuracy of the first transmission gear 241 may be improved significantly in the case where the bearing 44R supports the first transmission gear 241.

If the bearing 44R supports the transmission shaft 243, the first transmission gear 241 chatters by a degree corresponding to the play of the one-way clutch 244. In this preferred embodiment, the bearing 44R supports the first transmission gear 241, not the transmission shaft 243. Therefore, the first transmission gear 241 may be prevented from chattering due to the play of the one-way clutch 244. This may improve the run-out accuracy of the first transmission gear 241.

In the above-described preferred embodiments, the bearing 44R is a ball bearing. Alternatively, a rolling-element bearing other than the ball bearing may be used. For example, a roller bearing, a tapered roller bearing or the like may be used as the bearing 44R. Alternatively, a slide bearing may be used as the bearing 44R. Even in the case where the bearing 44R is a slide bearing, the run-out accuracy of the first transmission gear 241 may be improved as long as the inner circumferential portion of the bearing 44R supports the first transmission gear 241, not the transmission shaft 243, and the outer circumferential portion of the bearing 44R is supported by the housing 21.

In the case where the bearing 44R is a ball bearing, both of a radial load (load in a direction perpendicular to the axial direction) and an axial load (load parallel to the axial direction) may be supported by the bearing 44R. In the case where, for example, a helical gear is used as each of the first transmission gear 241 and the second transmission gear 242, a load is generated both in a radial direction and an axial direction. In the case of being a ball bearing, the bearing 44R may support the loads in these directions. A ball bearing may be shortened in length in the axial direction (thickness) more easily than a roller bearing or a tapered roller bearing. Therefore, use of a ball bearing may further decrease the width of the drive unit 20.

The bearings included in the drive unit 20 other than the bearing 44R may each be a rolling-element bearing or a slide bearing.

Support Structure of the Driven Gear 233

Now, a structure that supports the driven gear 233 will be described. FIG. 5 is a cross-sectional view showing an example of structure of the driven gear 233 and the vicinity thereof in the drive unit 20.

As described above, the driven gear 233 is provided in the outer member 52 of the one-way clutch 50. The drive sprocket 34 is attached to a portion of the outer member 52 that is outward of (to the right of) the housing 21.

While the electrically assisted bicycle 10 is running with both of the outer member 52 and the drive sprocket 34 rotating, a load is applied from the drive sprocket 34 to the outer member 52. Because of the load from the drive sprocket 34, precession is caused in the outer member 52 including the driven gear 233. In the case where the precession is large, there occurs a problem that the meshing precision of the driven gear 233 and the idle gear 41 is decreased.

In this preferred embodiment, two bearings 381R and 382R are provided as the bearing 38R supporting the outer member 52. The bearings 381R and 382R are each a rolling-element bearing including an inner race, an outer race and a rolling element. The outer race of each of the bearings 381R and 382R is press-fit into the second case 212 of the housing 21, and the outer member 52 is clearance-fit into the inner race thereof.

In the left-right direction of the drive unit 20, the bearing 382R is located at an outer position whereas the bearing 381R is located at an inner position. The bearings 381R and 382R may be in contact with each other, or may be located separately from each other.

The outer member 52 is supported by the two bearings 381R and 382R so that the rotation shake of the outer member 52 may be decreased, and thus the precession of the outer member 52 may be decreased. The decrease in the precession may improve the meshing precision of the driven gear 233 and the idle gear 41. With this structure, the noise generated when the driven gear 233 and the idle gear 41 are meshed with each other may be decreased, and abrasion of the rotation shaft may be decreased. In addition, the sealability of the bearings 381R and 382R supporting the outer member 52 may be improved.

Now, the positional relationship among the drive sprocket 34, the driven gear 233 and the bearings 381R and 382R will be described.

In the axial direction of the pedal crank shaft 22, the distance to the most inner position of the bearing 381R (left end portion of the bearing 381R) from a position 341, in the outer member 52, to which the drive sprocket 34 is attached is labeled as a. In the axial direction of the pedal crank shaft 22, the distance from the attachment position 341 to the center of a portion where the driven gear 233 and the idle gear 41 are meshed with each other is labeled as b. The relationship between distance a and distance b may be represented by expression 1 below.

$$a/b \geq 0.5 \qquad \text{expression 1}$$

The bearing 381R is located at an inner position in the left-right direction of the drive unit 20. As the position of the bearing 381R is farther from the position 341 at which the drive sprocket 34 is attached, the precession of the outer member 52 may be decreased more. The bearing 381R is located such that the left end portion thereof is located inward of the middle position of distance b in the left-right direction of the drive unit 20, and consequently, the precession of the outer member 52 may be decreased more.

The bearing 381R is located far from the position 341 at which the drive sprocket 34 is attached, whereas the bearing 382R is located as close as possible to the attachment position 341, so that the precession of the outer member 52 may be decreased more. For example, the bearing 382R is located such that a left end portion thereof is located outward of the middle position of distance b in the left-right direction of the drive unit 20. Consequently, the precession of the outer member 52 may be decreased more.

The bearings 381R and 382R may have the same size as, or different sizes from, each other.

A multi-row bearing may be used instead of the bearings 381R and 382R. Examples of the usable multi-row bearing include a multi-row angular bearing, a multi-row deep groove bearing and the like, but are not limited any of these. A needle bearing may be used instead of the bearings 381R and 382R.

Heat Dissipation Structure

Figure 6:
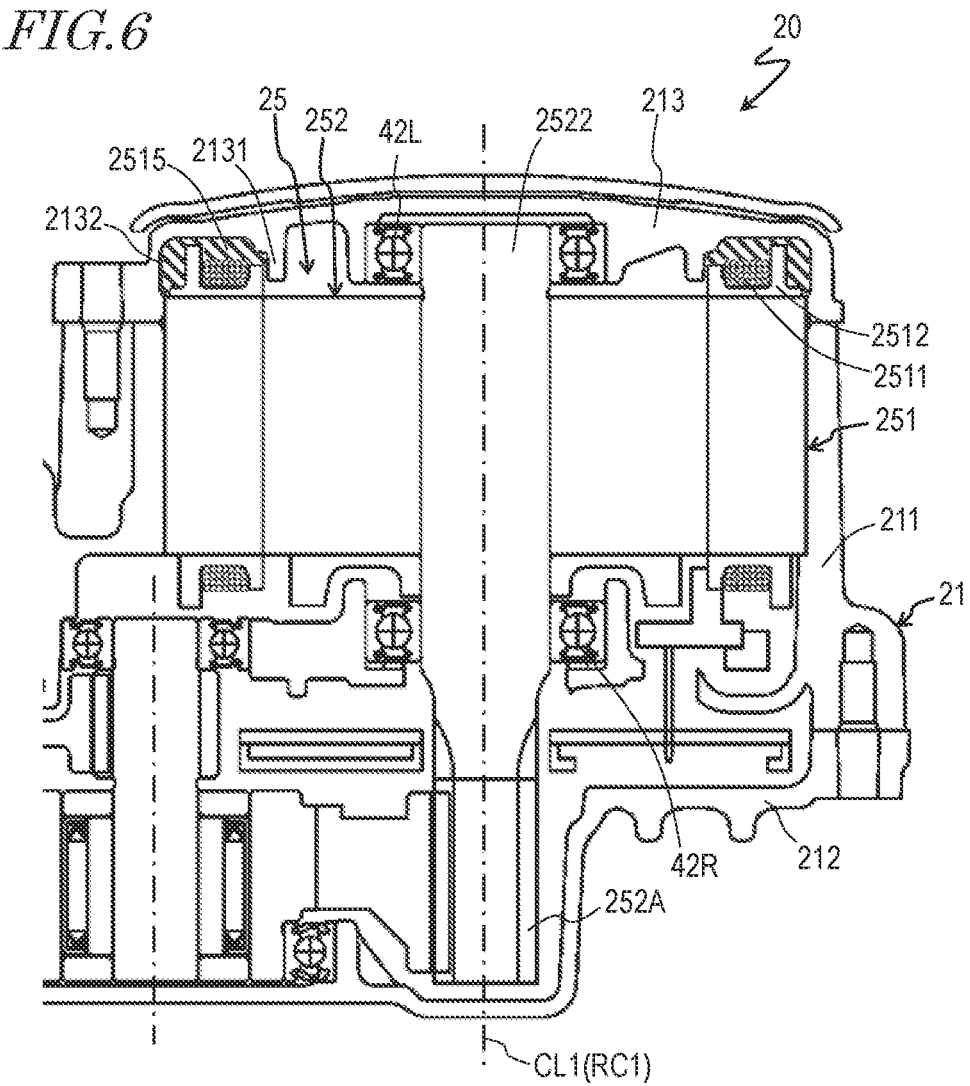
FIG. 6 is a cross-sectional view showing a structure of an electric motor 25 and the vicinity thereof in the drive unit 20 according to a preferred embodiment of the present invention.

Now, a structure that dissipates heat generated in the coils 2511 of the electric motor 25 to the outside will be described. FIG. 6 is a cross-sectional view showing a structure of the electric motor 25 and the vicinity thereof in the drive unit 20. In the example shown in FIG. 6, a heat dissipation agent 2515 (hatched portion in FIG. 6) is located between the stator 251 of the electric motor 25 and the cover 213 of the housing 21. The heat dissipation agent 2515 is provided between the coils 2511 wound around the bobbins 2512 of the stator 251 and the cover 213 so that the heat generated in the coils 2511 may be dissipated outside efficiently.

The heat dissipation agent 2515 may be made of any material having a high heat conductivity. Examples of the material usable for the heat dissipation agent 2515 include highly heat-conductive epoxy and unsaturated polyester resins each having an alumina filler incorporated thereto, but are not limited to any of these.

It is possible to dissipate the heat even in the case where the entire circumference of each of the coils 2511 wound around the bobbins 2512 is covered with the heat dissipation agent 2515. However, in the case where the heat dissipation agent 2515 is provided to fill the space so as to cover the entire circumference of each of the coils 2511, there occurs a problem that the weight of the drive unit 20 is increased. In the case where the entire circumference of each of the coils 2511 is covered with the heat dissipation agent 2515, a mold to be filled with the heat dissipation agent 2515 is needed, and thus there occurs a problem that the production cost and the number of production steps are increased.

In this preferred embodiment, the heat dissipation agent 251 is provided only between the stator 251 and the cover 213 so that the heat generated in the coils 2511 may be dissipated to the outside efficiently while reducing or minimizing the increase in the weight.

With reference to FIG. 6, the cover 213 in this preferred embodiment includes an inner wall 2131. The cover 213 has a shape with which a left portion of each of the bobbins 2512, around each of which the coil 2511 is wound, is covered with the inner wall 2131 and an outer circumferential wall 2132 of the cover 213. During the production of the drive unit 20, the heat dissipation agent 2515 is applied between the inner wall 2131 and the wall 2132 of the cover 213. The cover 213 having the heat dissipation agent 2515 applied thereto is attached to the first case 211 of the housing 21, and thus the structure including the heat dissipation agent 2515 between the coils 2511 and the cover 213 may easily be realized. A mold to be filled with the heat dissipation agent 2515 is not needed, and thus the production cost and the number of production steps may be decreased.

The cover 213 includes the inner wall 2131, so that while the heat dissipation agent 2515 is applied to the cover 213, the heat dissipation agent 2515 may be prevented from flowing to an area where the heat dissipation agent 2515 is not necessary. The left portion of each of the bobbins 2512, around each of which the coil 2511 is wound, is covered with the inner wall 2131 and the wall 2132 of the cover 213, so that the heat dissipation agent 2515 may be prevented from flowing toward the rotor 252.

Preferred embodiments of the present invention have been described above. The present invention is not limited to the above-described preferred embodiments. For example, in the above-described preferred embodiments, the electrically assisted bicycle including the suspension is described as an example. Preferred embodiments of the present invention are preferably applicable also to an electrically assisted bicycle with no suspension.

In the above-described preferred embodiments, the drive unit 20 (FIG. 2) includes four shafts, namely, the output shaft 2522, the transmission shaft 243, the rotation shaft 43 and the pedal crank shaft 22. The number of the shafts is not limited to four. Preferred embodiments of the present invention are also applicable to, for example, a three-axis drive unit in which neither the idle gear 41 nor the rotation shaft 43 is included and the second transmission gear 242 and the driven shaft 243 are directly meshed with each other. Preferred embodiments of the present invention are also applicable to a drive unit including five or more shafts.

In the above-described preferred embodiments, a drive unit of a type in which the human power and the assist power provided by the electric motor 25 are combined by a component rotatable coaxially with the pedal crank shaft 22 (crank combining type) is shown as an example. The present invention is not limited to this. Preferred embodiments of the present invention are preferably applicable to a drive unit in which the human power and the assist power are combined by a chain (chain combining type). In a chain combining-type drive unit, the outer member 52 does not include the driven gear 233 receiving the assist drive power provided by the electric motor 25.

In the above-described preferred embodiments, the entirety of the electric motor 25 is accommodated in the housing 21. The structure of the housing 21 is not limited to this. Only a portion of the electric motor 25 may be accommodated in the housing 21. For example, a left portion of the first case 211 may have an opening through which the electric motor 25 may pass, and the electric motor 25 may be attached such that a portion thereof is located in the housing 21 through the opening. In this case, the opening may be provided with a dust-proof and waterproof cover.

The cover 213 (FIG. 2) may be a portion of the housing 21, and may be included in the housing 21. The cover 213 may have such a shape as to cover a side surface of the electric motor 25, and the electric motor 25 may be supported by the cover 213. A form in which the electric motor 25 is supported by the cover 213 is encompassed in the form in which the electric motor 25 is supported by the housing 21.

In the above-described preferred embodiments, the electrically assisted bicycle with two wheels is described as an example of the electrically assisted vehicle 10. The present invention is not limited to this. For example, the electrically assisted vehicle 10 may be an electrically assisted vehicle with three or more wheels.

In the above-described preferred embodiments, the drive wheel to which the human power generated by the rider stepping on the pedals and the assist power generated by the motor are transmitted is the rear wheel. The present invention is not limited to this. The human power and the assist power may be transmitted to the front wheel, or both of the front wheel and the rear wheel, in accordance with the form of the electrically assisted bicycle.

In the above-described preferred embodiments, the vehicle is the electrically assisted bicycle, but alternatively, may be a vehicle other than the electrically assisted bicycle. Preferred embodiments of the present invention are preferably applicable to any vehicle in which the drive unit is required to have a decreased size.

Illustrative preferred embodiments of the present invention have been described above.

A drive unit 20 according to a preferred embodiment of the present invention is usable in an electrically assisted bicycle 10. The drive unit includes an electric motor 25 including an output shaft 2522 having an output gear 252A; a housing 21 accommodating a portion of, or the entirety of, the electric motor 25; a pedal crank shaft 22 extending through the housing 21, rotatably supported by the housing 21, and provided with a driven gear 233; and a transmission mechanism 40 to transmit a torque of the output gear 252A of the electric motor 25 to the driven gear 233. The transmission mechanism 40 includes a decelerator 24 rotatably supported by the housing 21 in the housing 22, the decelerator 24 including a first transmission gear 241, a second transmission gear 242 having teeth of a smaller number than that of the first transmission gear 241, and a transmission shaft 243 to transmit a rotation of the first transmission gear 241 to the second transmission gear 242; and also includes a bearing 44R supporting the first transmission gear 241 in the housing 21 such that the first transmission gear 241 is rotatable. Distance d1, in a first direction 448 in which the transmission shaft 243 extends in the housing 21, from a reference plane 447 to teeth 2413 of the first transmission gear 241 is less than distance h in the first direction 448 from the reference plane 447 to an innermost portion 446 of the bearing 44R. The reference plane passes through an outermost portion 445 of the bearing 44R and is perpendicular to the first direction 448.

As seen in the direction 449 perpendicular to the direction in which the transmission shaft 243 of the decelerator 24 extends, at least a portion of the bearing 44R overlaps the teeth 2413 of the first transmission gear 241 of the decelerator 24. With this structure, the size (width) of the drive unit 20 in the direction in which the transmission shaft 243 extends (in the axial direction) may be decreased.

In a preferred embodiment of the present invention, the bearing 44R may be located between the reference plane 447 and the first transmission gear 241 in the first direction 448.

Distance d1 from the reference plane 447 to the teeth 2413 of the first transmission gear 241 is less than distance h from the reference plane 447 to the innermost portion 446 of the bearing 44R. In addition, the bearing 44R is located between the reference plane 447 and the first transmission gear 241. With this structure, the size (width) of the drive unit 20 in the axial direction may be decreased.

In a preferred embodiment of the present invention, distance L1 between the bearing 44R and the transmission shaft 243 may be less than distance L2 between the teeth 2413 of the first transmission gear 241 and the transmission shaft 243, and the first transmission gear 241 may have a recessed portion 2415 in a region facing the bearing 44R, the recessed portion being recessed in a direction in which the distance from the reference plane 447 relatively increases.

The first transmission gear 241 has the recessed portion 2415 in a region facing the bearing 44R so that the bearing 44R may be located between the teeth 2413 of the first transmission gear 241 and the transmission shaft 243.

In a preferred embodiment of the present invention, the bearing 44R may support the first transmission gear 241 with an inner circumferential portion 441 of the bearing 44R, and an outer circumferential portion 442 of the bearing 44R may be supported by the housing 21.

The outer circumferential portion 442 of the bearing 44R, which supports the first transmission gear 241, not the transmission shaft 243, with the inner circumferential portion, is supported by the housing 21. This may improve the run-out accuracy of the first transmission gear 241.

In a preferred embodiment of the present invention, the first transmission gear 241 may include a metal inner portion 2412 and a resin outer portion 2411 expanding outward in a radial direction from the metal inner portion 2412, and the inner circumferential portion 441 of the bearing 44R may support the metal inner portion 2412.

The inner circumferential portion 441 of the bearing 44R supports the metal inner portion 2412 of the first transmission gear 241, not the transmission shaft 243. This may improve the run-out accuracy of the first transmission gear 241.

In a preferred embodiment of the present invention, the decelerator 24 may include a one-way clutch 244 coupling the transmission shaft 243 and the first transmission gear 241 to each other, and the one-way clutch 244 may regulate the rotation of the first transmission gear 241 with respect to the transmission shaft 243 to one direction.

If the bearing 44R supports the transmission shaft 243, the first transmission gear 241 chatters by a degree corresponding to the play of the one-way clutch 244. In a preferred embodiment of the present invention, the bearing 44R supports the first transmission gear 241, not the transmission shaft 243. Since the bearing 44R supports the first transmission gear 241, the run-out accuracy of the first transmission gear 241 may be improved in a structure in which the one-way clutch 244 is located between the transmission shaft 243 and the first transmission gear 241.

In a preferred embodiment of the present invention, distance d2 from the reference plane 447 to the one-way clutch 244 may be less than distance h from the reference plane 447 to the innermost portion 446 of the bearing 44R.

As seen in the direction 449 perpendicular to the direction in which the transmission shaft 243 of the decelerator 24 extends, at least a portion of the bearing 44R overlaps the one-way clutch 244. With this structure, the size (width) of the drive unit 20 in the axial direction may be decreased.

In a preferred embodiment of the present invention, the bearing 44R may be a ball bearing device.

Since the bearing 44R is a ball bearing, both of a radial load (load in a direction perpendicular to the axial direction) and an axial load (load parallel to the axial direction) may be supported by the bearing 44R.

In a preferred embodiment of the present invention, the bearing 44R may include an inner race 441, an outer race 442 and a plurality of rolling elements 443 provided between the inner race 441 and the outer race 442, the bearing 44R may support the first transmission gear 241 with the inner race 441, and the outer race 442 of the bearing 44R may be supported by the housing 21.

The outer race 442 of the bearing 44R, which supports the first transmission gear 241, not the transmission shaft 243, with the inner race 441, is supported by the housing 21. This may improve the run-out accuracy of the first transmission gear 241.

In a preferred embodiment of the present invention, the first transmission gear 241 may include a metal inner portion 2412 and a resin outer portion 2411 expanding outward in the radial direction from the metal inner portion 2412, and the inner race 441 of the bearing 44R may be secured to the metal inner portion 2412.

The inner race 441 of the bearing 44R is secured to the metal inner portion 2412 of the first transmission gear 241, not to the transmission shaft 243. This may improve the run-out accuracy of the first transmission gear 241.

An electrically assisted bicycle 10 according to a preferred embodiment of the present invention includes the above-described drive unit 20.

The size of the drive unit 20 in the left-right direction of the electrically assisted bicycle 10 is small. Therefore, the degree of freedom of positional arrangement of the drive unit 20 and the other components in the electrically assisted bicycle 10 may be improved. The degree of freedom of the shape and the size of the electrically assisted bicycle 10 and the above-mentioned other components may also be improved.

Preferred embodiments of the present invention are especially useful in the field of electrically assisted vehicles and drive units mountable on the electrically assisted vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit usable in an electrically assisted vehicle, the drive unit comprising:
    an electric motor including an output shaft including an output gear;
    a housing accommodating a portion of, or an entirety of, the electric motor;
    a pedal crank shaft extending through the housing, rotatably supported by the housing, and including a driven gear; and
    a transmission to transmit a torque of the output gear of the electric motor to the driven gear;
    wherein the transmission includes:
        a decelerator rotatably supported by the housing in the housing, and including a first transmission gear, a second transmission gear having teeth of a smaller number than that of the first transmission gear, and a transmission shaft to transmit a rotation of the first transmission gear to the second transmission gear; and
        a bearing supporting the first transmission gear in the housing such that the first transmission gear is rotatable; wherein
    a distance, in a first direction in which the transmission shaft extends in the housing, from a reference plane to teeth of the first transmission gear is less than a distance in the first direction from the reference plane to an innermost portion of the bearing, in which reference plane passes through an outermost portion of the bearing and is perpendicular to the first direction; and
    the transmission shaft includes a near end and a far end that is farther away from a stator of the electric motor than the near end, and the bearing is located at the far end of the transmission shaft.

2. The drive unit of claim 1, wherein the bearing is located between the reference plane and the first transmission gear in the first direction.

3. The drive unit of claim 1, wherein
    a distance between the bearing and the transmission shaft is less than a distance between the teeth of the first transmission gear and the transmission shaft; and
    the first transmission gear includes a recessed portion in a region facing the bearing and that is recessed in a direction in which the distance from the reference plane increases.

4. The drive unit of claim 1, wherein
    the bearing supports the first transmission gear with an inner circumferential portion of the bearing; and
    an outer circumferential portion of the bearing is supported by the housing.

5. The drive unit of claim 1, wherein
    the first transmission gear includes a metal inner portion and a resin outer portion expanding outward in a radial direction from the metal inner portion; and
    the inner circumferential portion of the bearing supports the metal inner portion.

6. The drive unit of claim 1, wherein
    the decelerator includes a one-way clutch coupling the transmission shaft and the first transmission gear to each other; and
    the one-way clutch regulates the rotation of the first transmission gear with respect to the transmission shaft to one direction.

7. The drive unit of claim 6, wherein a distance from the reference plane to the one-way clutch is less than the distance from the reference plane to the innermost portion of the bearing.

8. The drive unit of claim 1, wherein the bearing includes a ball bearing.

9. The drive unit of claim 8, wherein the bearing includes an inner race, an outer race and a plurality of rolling elements provided between the inner race and the outer race;
    wherein the bearing supports the first transmission gear with the inner race, and
    wherein the outer race of the bearing is supported by the housing.

10. The drive unit of claim 9, wherein
    the first transmission gear includes a metal inner portion and a resin outer portion expanding outward in the radial direction from the metal inner portion; and
    the inner race of the bearing is secured to the metal inner portion.

11. An electrically assisted vehicle comprising:
    the drive unit according to claim 1.

12. A drive unit usable in an electrically assisted vehicle, the drive unit comprising:
    an electric motor including an output shaft including an output gear;
    a housing accommodating a portion of, or an entirety of, the electric motor;
    a pedal crank shaft extending through the housing, rotatably supported by the housing, and including a driven gear; and
    a transmission to transmit a torque of the output gear of the electric motor to the driven gear;
    wherein the transmission includes:
        a decelerator rotatably supported by the housing in the housing, and including a first transmission gear, a second transmission gear having teeth of a smaller number than that of the first transmission gear, and a transmission shaft to transmit a rotation of the first transmission gear to the second transmission gear; and
        a bearing supporting the first transmission gear in the housing such that the first transmission gear is rotatable; wherein
    a distance, in a first direction in which the transmission shaft extends in the housing, from a reference plane to teeth of the first transmission gear is less than a distance in the first direction from the reference plane to an innermost portion of the bearing, in which reference plane passes through an outermost portion of the bearing and is perpendicular to the first direction; and
    the first transmission gear is farther away from a stator of the electric motor than the second transmission gear.

13. A drive unit usable in an electrically assisted vehicle, the drive unit comprising:

an electric motor including an output shaft including an output gear;

a housing accommodating a portion of, or an entirety of, the electric motor;

a pedal crank shaft extending through the housing, rotatably supported by the housing, and including a driven gear; and a transmission to transmit a torque of the output gear of the electric motor to the driven gear;

wherein the transmission includes:

a decelerator rotatably supported by the housing in the housing, and including a first transmission gear, a second transmission gear having teeth of a smaller number than that of the first transmission gear, and a transmission shaft to transmit a rotation of the first transmission gear to the second transmission gear; and a bearing supporting the first transmission gear in the housing such that the first transmission gear is rotatable; wherein a distance, in a first direction in which the transmission shaft extends in the housing, from a reference plane to teeth of the first transmission gear is less than a distance in the first direction from the reference plane to an innermost portion of the bearing, in which reference plane passes through an outermost portion of the bearing and is perpendicular to the first direction; and the bearing directly supports the first transmission gear.

\* \* \* \* \*